United States Patent
Jung et al.

(10) Patent No.: US 7,653,288 B2
(45) Date of Patent: Jan. 26, 2010

(54) INFORMATION STORAGE MEDIUM HAVING DATA STRUCTURE FOR BEING REPRODUCED ADAPTIVELY ACCORDING TO PLAYER PROFILE INFORMATION, METHOD FOR REPRODUCING AV DATA IN INTERACTIVE MODE

(75) Inventors: Kil-soo Jung, Taeen-eup (KR); Sung-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 885 days.

(21) Appl. No.: 10/902,252

(22) Filed: Jul. 30, 2004

(65) Prior Publication Data

US 2005/0053360 A1 Mar. 10, 2005

(30) Foreign Application Priority Data

Aug. 16, 2003 (KR) ............... 10-2003-0056722
Sep. 3, 2003 (KR) ............... 2003-61571
Sep. 3, 2003 (KR) ............... 2003-61572

(51) Int. Cl.
*H04N 7/00* (2006.01)
*H04N 5/00* (2006.01)

(52) U.S. Cl. ............... 386/95; 386/125

(58) Field of Classification Search ............... 386/95, 386/125, 126
See application file for complete search history.

(56) References Cited

U.S. PATENT DOCUMENTS 5,771,334 A * 6/1998 Yamauchi et al. ............ 386/95
6,336,002 B1 * 1/2002 Yamauchi et al. ............ 386/95
6,529,526 B1 * 3/2003 Schneidewend ............ 370/486
6,735,625 B1 * 5/2004 Ponna ............ 709/223
7,082,257 B2 * 7/2006 Yamauchi et al. ............ 386/95
7,295,207 B2 * 11/2007 Yoon et al. ............ 345/473
7,340,613 B2 * 3/2008 Okamoto et al. ............ 713/193
2002/0078144 A1 * 6/2002 Lamkin et al. ............ 709/203
2002/0099829 A1 * 7/2002 Richards et al. ............ 709/227
2003/0012558 A1 * 1/2003 Kim et al. ............ 386/97
2003/0152366 A1 8/2003 Kanazawa et al.
2003/0161615 A1 * 8/2003 Tsumagari et al. ............ 386/95
2003/0215224 A1 * 11/2003 Yoo et al. ............ 386/125
2004/0001697 A1 * 1/2004 Kambayashi et al. ......... 386/69

(Continued)

FOREIGN PATENT DOCUMENTS

CN 1395422 A 2/2003

(Continued)

OTHER PUBLICATIONS

Korean Office Action issued Aug. 27, 2005 in co-pending Korean Application No. 10-2003-0061571.

(Continued)

*Primary Examiner*—Thai Tran
*Assistant Examiner*—Gelek Topgyal
(74) *Attorney, Agent, or Firm*—Stein McEwen, LLP (57) ABSTRACT

A method of reproducing audio/video data in an interactive mode, including reading profile information indicating a version of interactive data; selecting and reading the interactive data that is manufactured with a version that is supported by a reproducing apparatus by referring to the read profile information; and interpreting and executing the read interactive data.

15 Claims, 8 Drawing Sheets

U.S. PATENT DOCUMENTS

2005/0166232 A1* 7/2005 Lamkin et al. ............... 725/43
2006/0222340 A1* 10/2006 Yamauchi et al. ............. 386/95

FOREIGN PATENT DOCUMENTS

| | | |
|---|---|---|
| EP | 1 868 205 | 12/2007 |
| JP | 2000-067522 | 3/2000 |
| JP | 2001-344951 | 12/2001 |
| JP | 2003-018584 | 1/2003 |
| JP | 2003-134440 | 5/2003 |
| WO | WO 02/05104 | 1/2002 |
| WO | WO 03/090225 | 10/2003 |
| WO | WO2005/017896 | 2/2005 |

OTHER PUBLICATIONS

Korean Office Action issued Aug. 27, 2005 in co-pending Korean Application No. 10-2003-0061572.

U.S. Appl. No. 10/902,274, filed Jul. 30, 2004, Kil-soo Jung et al., Samsung Electronics Co., Ltd.

Office Action issued in Chinese Patent Application No. 200480019299X on Aug. 8, 2008.

Office Action issued by European Patent Office in European Patent Application No. 04774305.9-2223 on Jan. 21, 2009.

\* cited by examiner

<STARTUP.MLS>

```
<startup>
    <walledgarden href="file://dvdrom:/DVD_ENAV/walledgarden.1st"/>        A
    <loadinginfo href="file://dvdrom:/DVD_ENAV/LoadingInformation1.ldi">
        <condition name="profile" value="01"/>
    </loadinginfo>                                                         B
    <loadinginfo href="file://dvdrom:/DVD_ENAV/LoadingInformation2.ldi">
        <condition name="profile" value="00"/>
    </loadinginfo>
</startup>
```

FIG. 8

| SYSTEM PARAMETERS | MEANINGS |
|---|---|
| 0 | Menu Description Language Code(M_LCD) |
| 1 | Audio stream number(ASTN) for Title Domain(TT_DOM) |
| 2 | Sub-picture stream number(SPSTN) and On/OFF flag for TT_DOM |
| 3 | Angle number(AGLN) for TT_DOM |
| 4 | Title number(TTN) for TT_DOM |
| 5 | VTS Title number(VTS_TTN) for TT_DOM |
| 6 | Title PGC number(TT_PGCN) for TT_DOM |
| 7 | Part_of Title number(PTTN) for One_Sequential_PGC_Title |
| 8 | Highlighted Button number(HL_BTNN) for Selection state |
| 9 | Navigation Timer(NV_TMR) |
| 10 | TT_PGCN for NV_TMR |
| 11 | Player Audio Mixing Mode(P_AMXMD) for Karaoke |
| 12 | Country Code(CTY_CD) for Parental Management |
| 13 | Parental Level(PTL_LVL) |
| 14 | Player Configuration(P_CFG) for Video |
| 15 | P_CFG for Audio |
| 16 | Initial Language Code(INI_LCD) for Audio Stream(AST) |
| 17 | Initial Language Code extension(INI_LCD_EXT) for AST |
| 18 | INI_LCD for Sub-picture Stream(SPST) |
| 19 | INI_LCD_EXT for SPST |
| 20 | Player Region Code |
| 21 | Player Profile Code |
| 22 | |
| 23 | |

FIG. 9

| b15 | b14 | b13 | b12 | b11 | b10 | b9 | b8 |
|-----|-----|-----|-----|-----|-----|----|----|
| reserved ||||||||

| b7 | b6 | b5 | b4 | b3 | b2 | b1 | b0 |
|----|----|----|----|----|----|----|----|
| reserved |||||| player profile code ||

FIG. 10

INFORMATION STORAGE MEDIUM HAVING DATA STRUCTURE FOR BEING REPRODUCED ADAPTIVELY ACCORDING TO PLAYER PROFILE INFORMATION, METHOD FOR REPRODUCING AV DATA IN INTERACTIVE MODE

CROSS-REFERENCE TO RELATED APPLICATIONS

This application claims the priorities of Korean Patent Application Nos. 2003-56722, filed on Aug. 16, 2003, 2003-61571, filed on Sep. 3, 2003, and 2003-61572, field on Sep. 3, 2003, in the Korean Intellectual Property Office, the disclosures of which are incorporated herein by reference.

BACKGROUND OF THE INVENTION

1. Field of the Invention

The present invention relates to an apparatus and method for reproducing audio/video (AV) data in interactive mode, and an information storage medium therefor.

2. Description of the Related Art

Interactive DVDs that can be reproduced in an interactive mode using a conventional personal computer (PC). An interactive DVD refers to a DVD in which interactive data is recoded in addition to recorded DVD-Video data. Interactive DVDs are reproduced in either of two modes. One mode is a video mode in which only DVD-Video data is reproduced, such as with an ordinary DVD. The other mode is an interactive mode in which DVD-Video data is reproduced together with a markup document and is displayed through a display window of the markup document. If the interactive mode is selected by a user, a web browser embedded in the PC parses and displays a markup document recorded on the interactive DVD. In the display window defined by the markup document, DVD-Video data selected by the user is displayed.

For example, if the DVD-Video data is a film, the film is reproduced in the display window of the markup document and in the remaining part the script, synopsis, photos of actors, and other related additional information of the film can be displayed. Additional information is also displayed in synchronism with a title (AV data). For example, when an actor is displayed on an AV screen, interactive data containing career information on the actor is reproduced and displayed.

Interactive data includes markup documents written in markup languages, script codes manufactured using files inside the markup documents or separate files and linked to the markup documents, audio files, animation files, and image files linked to the markup documents and reproduced together with the markup documents. In order to reflect a user's demands, a variety of functions can be added to a user interface in interactive mode. Thus, when there is a reproducing apparatus for supporting the interactive mode, the range of interactive data that is needed in reproducing AV data in the interactive mode in each reproducing apparatus can be varied.

SUMMARY OF THE INVENTION

The invention provides an information storage medium having a data structure for being reproduced adaptively in a variety of reproducing apparatuses having different ranges of interactive data that is needed in reproducing AV data in an interactive mode, and a method and apparatus for reproducing AV data in the interactive mode therefor.

The invention also provides an information storage medium having a data structure having a high compatibility, and a method and apparatus for reproducing AV data in an interactive mode therefor.

According to an aspect of the invention, there is an information storage medium storing interactive data for reproducing audio/video (AV) data in an interactive mode, wherein the interactive data is displayed together with an AV screen obtained from the AV data and provides additional information related to the AV screen; and profile information indicating a version of the interactive data.

The interactive data may include a startup file that is initially read when the interactive mode is selected, and the profile information may be recorded in the startup file.

The profile information may be referred to so that interactive data that can be reproduced by a reproducing apparatus for reproducing the AV data in the interactive mode is selected.

According to another aspect of the invention, there is provided an information storage medium storing a plurality of ENAV applications manufactured with a plurality of versions so that AV data is reproduced in an interactive mode; and profile information that is referred to so that one is selected from the plurality of ENAV applications.

The profile information may be recorded using an element for linking loading information file contained in an ENAV application corresponding to a startup file that is initially read when the interactive mode is selected.

The loading information file may indicate position information of ENAV files belonging to a corresponding ENAV application.

According to another aspect of the invention, there is provided an apparatus for reproducing AV data in an interactive mode. The apparatus includes an AV reproducing engine which decodes AV data; and an ENAV engine which has player profile information indicating a version of a supportable ENAV application and interprets and executes an ENAV application selected by referring to the player profile information so that the AV data is reproduced in the interactive mode.

The player profile information may be stored as a system parameter.

According to another aspect of the invention, there is provided a method for reproducing AV data in an interactive mode. The method includes reading profile information indicating a version of interactive data; selecting and reading the interactive data manufactured with a version that can be supported by a reproducing apparatus, by referring to the read profile information; and interpreting and executing the read interactive data.

The reading profile information may include opening a startup file that is initially read when interactive mode is selected, and reading the profile information.

The reading profile information may include reading the profile information from the startup file recorded using an element for linking loading information file contained in a corresponding ENAV application or reading profile information indicating versions of a plurality of ENAV applications manufactured with a plurality of versions so that AV data is reproduced in the interactive mode.

The selecting and reading the interactive data may include reading a version of an ENAV application that can be supported by the reproducing apparatus, from player profile information stored as a system parameter or reading ENAV files belonging to the ENAV application by referring to the loading information file indicating position information of ENAV files belonging to a corresponding to an ENAV application.

Additional aspects and/or advantages of the invention will be set forth in part in the description which follows and, in part, will be obvious from the description, or may be learned by practice of the invention.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

In the present invention, 'interactive data' refers to data that is needed in reproducing audio/video data AV in an interactive mode. Interactive data includes markup documents written in markup languages and/or script codes, script code files linked to the markup documents or separately provided, program files, audio files, animation files, and image files which are resource files linked to the markup documents and displayed together with the markup documents. In other words, the interactive data serves as an application program that is needed in reproducing AV data in the interactive mode and simultaneously serves as additional contents provided together with AV data.

Figure 1:
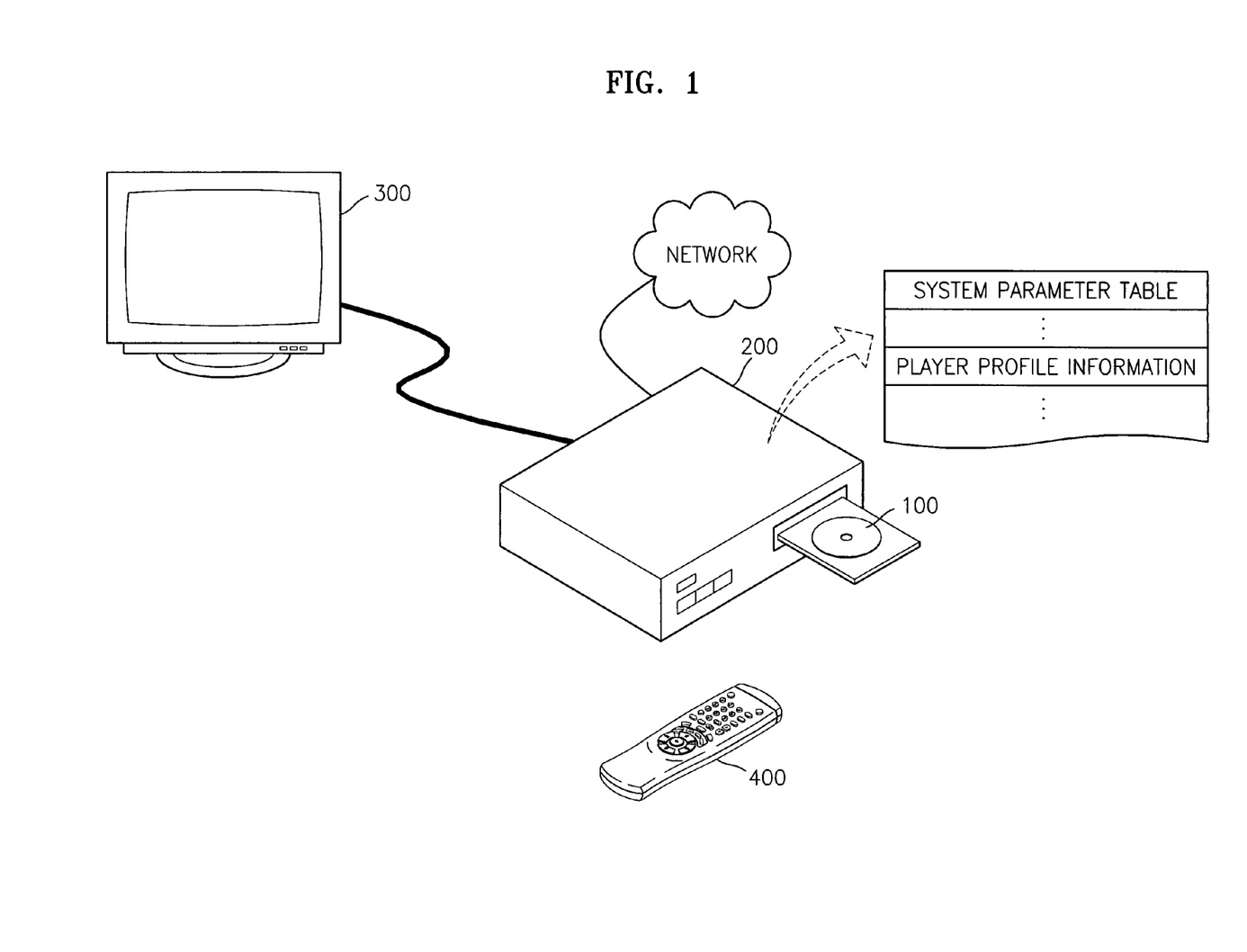
FIG. 1 schematically shows a structure of a reproducing system according to an embodiment of the invention.

FIG. 1 schematically shows a structure of a reproducing system according to an embodiment of the invention. Referring to FIG. 1, the reproducing system includes an Enhanced Audio/video (ENAV) disc 100 that is an information storage medium for supporting an interactive mode according to a reproducing apparatus 200, a display device 300, and a controller 400 that is a user input apparatus. The controller 400 receives a control command from the user and transmits the command to the reproducing apparatus 200. The reproducing apparatus 200 reproduces AV data recorded on the ENAV disc 100 in the interactive mode. The display device 300 may be a television and the controller 400 may be a remote controller.

If the ENAV disc 100 is placed on a DVD drive provided to the reproducing apparatus 200 and the user selects the interactive mode, the reproducing apparatus 200 reproduces corresponding AV data in the interactive mode and transmits the data to the display device 300. On the display device 300, an interactive screen and an AV screen embedded in the interactive screen obtained from the interactive data is displayed together.

'Interactive mode' refers to a mode in which AV data is displayed together with interactive data. In other words, AV data is displayed in a display window defined in a markup document such that an AV screen is displayed embedded in an interactive screen. The AV screen may be a screen displayed on the display device 300 by reproducing DVD-Video data recorded on the ENAV disc 100 using the reproducing apparatus 200, and the interactive screen indicates a screen displayed on the TV 300 after the interactive data recorded on the ENAV disc 100 is interpreted and executed using the reproducing apparatus 200.

'Video mode' is a mode in which AV data is reproduced such that only an AV screen obtained by reproducing corresponding AV data is displayed. The reproducing apparatus 200 may support both the interactive mode and the video mode. In addition, the reproducing apparatus 200 can receive/transmit AV data and/or interactive data from/to a network or an Internet connection.

In particular, the reproducing apparatus 200 has a system parameter table in which system parameters SPRMs are set, and the system parameter table has player profile information. The player profile information indicates the range of interactive data supported by the reproducing apparatus 200. In other words, the player profile information is the same as version information of interactive data supported by the reproducing apparatus 200. The version of interactive data may be, for example, a version of document type definition (DTD) of markup languages used to make ENAV files, a version of program languages used to make ENAV files, a version of languages used to implement one ENAV application or a version of specifications in which restriction conditions of a variety of resource files linked to markup documents.

Profile information indicates whether a version of stored interactive data is also recorded on the ENAV disc 100. The meaning of profile information is the same as the meaning of player profile information, except that, unlike the player profile information, the profile information is recorded on the ENAV disc 100 and indicates corresponding interactive data.

If a user selects the interactive mode, the reproducing apparatus 200 reads the profile information recorded on the ENAV disc 100, compares the profile information with its own player profile information as a system parameter and reproduces AV data in the interactive mode using interactive data selected according to a comparison result.

Figure 2:
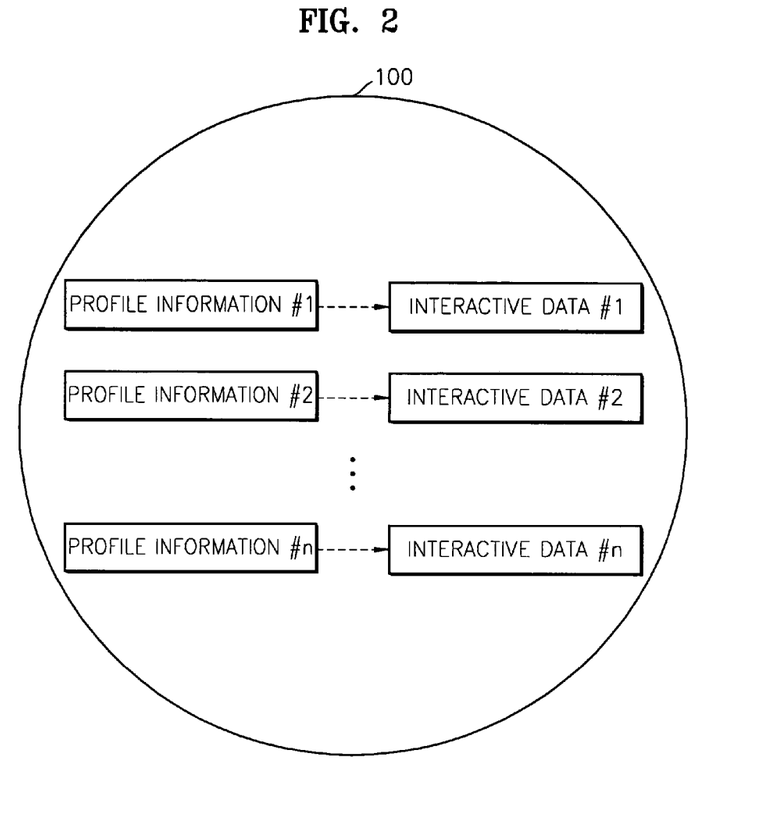
FIG. 2 is a diagram showing an embodiment of an ENAV disc according to an embodiment of the invention.

FIG. 2 is a diagram showing an ENAV disc 100 according to an aspect of the invention. Referring to FIG. 2, interactive data is recorded on the ENAV disc 100 to correspond to profile information. For example, as illustrated in FIG. 2, interactive data #1 corresponding to profile information #1 is recorded on the ENAV disc 100, interactive data #2 corresponding to profile information #2 is recorded on the ENAV disc 100, and interactive data #n corresponding to profile information #n is recorded on the ENAV disc 100 (where n is an integer number).

The profile information #1, #2, . . . , #n are recorded on the ENAV disc 100 separately with the interactive data #1, #2, . . . , and #n and may be linked to the interactive data #1, #2, . . . , and #n or included as a part of the interactive data #1, #2, . . . , and #n.

If the player profile information recorded in the recording apparatus 200 is the profile information #2, not only the interactive data #2 corresponding to the profile information #2 but also the interactive data #1 corresponding to the profile information #1 can be reproduced. Similarly, if the player profile information recorded in the recording apparatus 200 is the profile information #n, the reproducing apparatus 200 supports all of the interactive data #1, #2, . . . , and #n.

Thus, if the player profile information is the profile information #1, the reproducing apparatus 200 reproduces the interactive data #1. However, if the player profile information is the profile information #2, the reproducing apparatus 200 can reproduce the interactive data #2 and the interactive data #1, selectively. Of course, the reproducing apparatus 200 can set the interactive data #2 to be reproduced as default.

Figure 3:
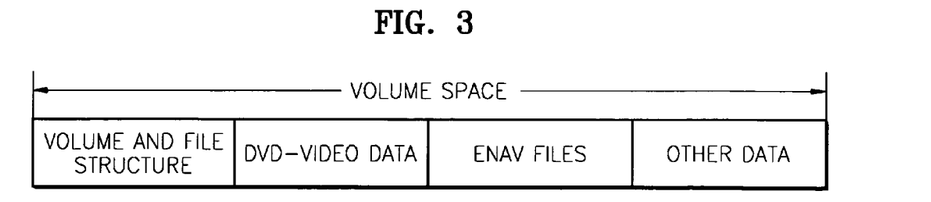
FIG. 3 schematically shows a volume space of an ENAV disc according to an embodiment of the invention.

FIG. 3 schematically shows a volume space of the ENAV disc 100 according to an aspect of the invention. Referring to FIG. 3, the volume space of the ENAV disc 100 comprises a volume and file structure region in which information on volume and file is recorded, a DVD-Video data region in which AV data, i.e., a video title is recorded as a DVD-Video format, an ENAV file region in which ENAV files for supporting an interactive mode are recorded, and an other data region.

Various information is recorded n the ENAV disk. For example, 'video_ts.ifo' includes reproduction control information for the entire video title recorded on the ENAV disc 100, vts_01_0.ifo includes reproduction control information for a first video title, and vts_01_0.vob, vts_01_1.vob, etc., which are AV data for constituting a video title, are recorded in the DVD-Video data region. Vts_01_0.vob, vts_01_1.vob, and so on are video titles, i.e., video objects. Vobu, in which a navigation pack, a video pack, and an audio pack are packed, is included in each vob. A detailed configuration thereof is described in a DVD-Video standard 'DVD-Video for Read Only Memory Disc 1.0'.

An ENAV application comprised of a plurality of ENAV files is stored in the ENAV file region. In other words, a startup file that is initially read when the interactive mode is selected, and a markup document corresponding to a selected video title are recorded as ENAV files. In this way, the interactive data is recorded as a plurality of ENAV files. The ENAV files are referred to as markup documents, script code files, program files, style sheets for defining styles of markup documents, audio files, animation files, and image files which are resource files linked to the markup documents and displayed together with the markup documents, as previously described.

Figure 4:
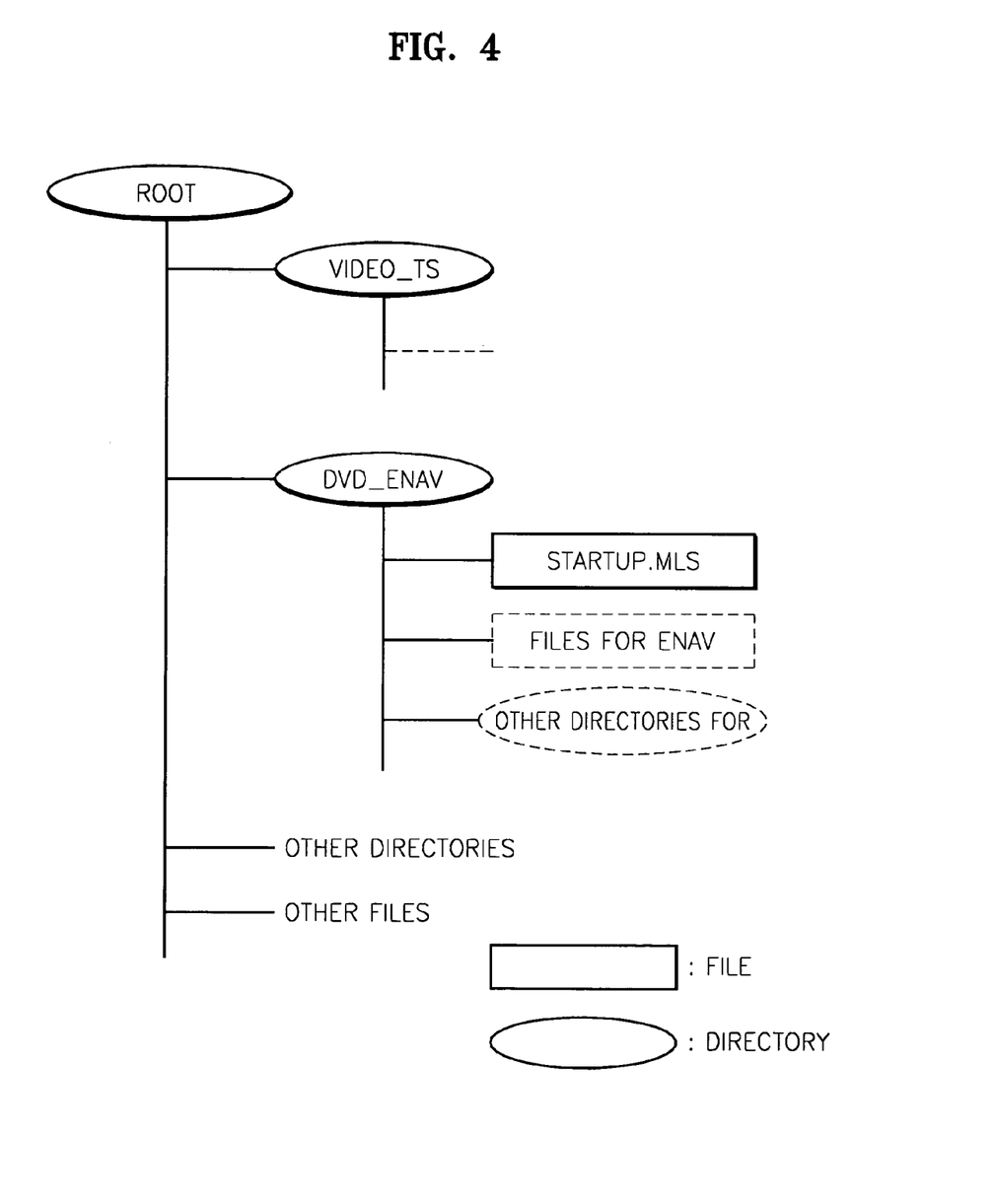
FIG. 4 is a diagram showing a directory structure of an ENAV disc according to an embodiment of the invention.

FIG. 4 is a diagram showing a directory structure of the ENAV disc according to an aspect of the invention. Referring to FIG. 4, a root directory includes a DVD video directory video_ts and an ENAV directory DVD_ENAV in which ENAV data that is needed in reproducing AV data in the interactive mode is recorded.

The data described with reference to FIG. 2, that is, video_ts.ifo, vts_01_0.ifo, vts_01_0.vob, vts_0_1.vob, etc., are stored in the DVD video directory video_ts. Data described with reference to FIG. 2, that is, a startup file startup.mls and other ENAV files are stored in the ENAV directory DVD_ENAV.

Figure 5:
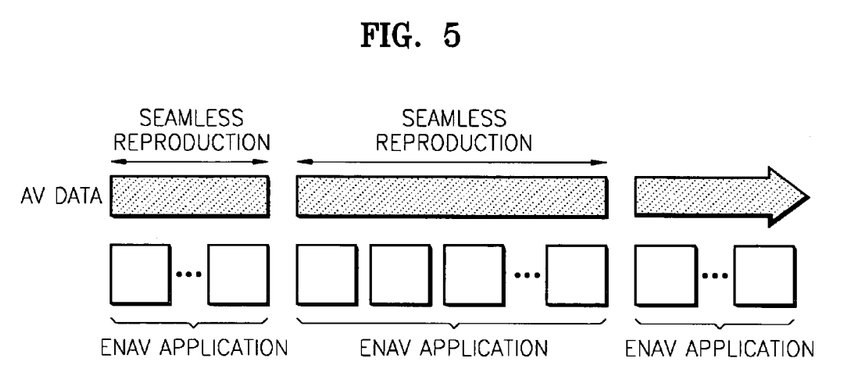
FIG. 5 shows the relation between AV data recorded on an ENAV disc according to an embodiment of the invention.

FIG. 5 shows the relation between AV data recorded on the ENAV disc 100 according to an aspect of the invention. Referring to FIG. 5, each ENAV application corresponds to AV data of which there is seamless reproduction. Each ENAV application is a set of a plurality of ENAV files. In order to have seamless reproduction of AV data, a corresponding ENAV application is buffered before AV data of the corresponding ENAV application is reproduced in an interactive mode. In other words, an ENAV application corresponding to AV data is buffered prior to reproducing the AV data in the interactive mode.

Each ENAV application contains one loading information file. Position information on ENAV files that are needed in reproducing corresponding AV data in the interactive mode is recorded in the loading information file. The position information on the ENAV files contains position information on ENAV files that should be buffered before a corresponding ENAV application is launched, that is, position information on ENAV files that should be preloaded.

Since preloading is performed on each ENAV application, seamless reproduction is guaranteed for AV data corresponding to each ENAV application. As such, a contents maker should make contents so that one ENAV application corresponds with one volume of a video title and one chapter of a video title in order to have a seamless reproduction.

Postloading refers to a buffering of a predetermined ENAV file after a corresponding ENAV application is launched. Not every ENAV file is required to be postloaded. When there is the need for postloading, position information on an ENAV file that should be postloaded is recorded in the loading information file.

Figure 6:
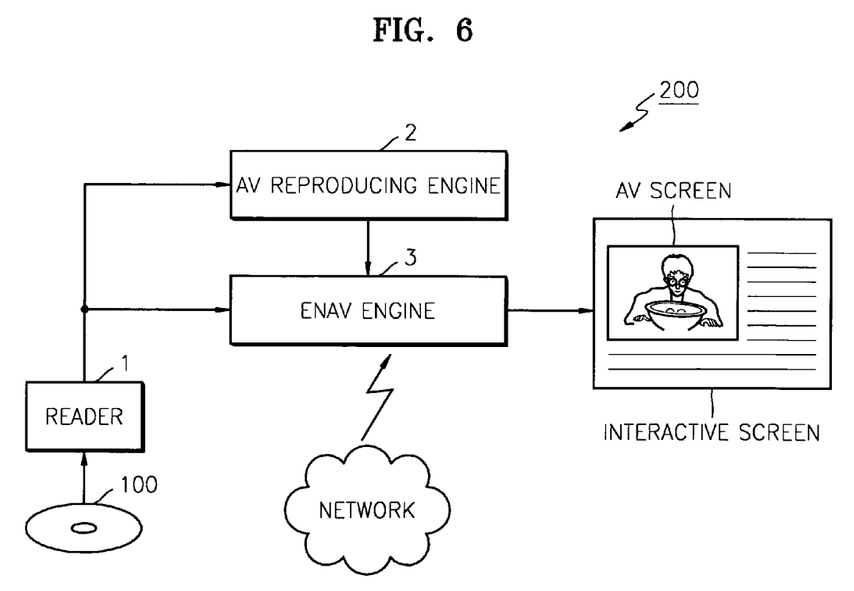
FIG. 6 is a block diagram of a reproducing apparatus according to an embodiment of the invention.

FIG. 6 is a block diagram of a reproducing apparatus 200 according to an aspect of the invention. Referring to FIG. 6, the reproducing apparatus 200 comprises a reader 1, an AV reproducing engine 2, and an ENAV engine 3.

The reader 1 reads AV data, i.e., DVD-Video data and ENAV files, recorded on the ENAV disc 100 in response to a control signal generated from the ENAV engine 3.

The AV reproducing engine 2 reproduces AV data read by the reader 2. In the present aspect of the invention, AV data is recorded as DVD-Video data; therefore, the AV reproducing engine 2 is used as a DVD-Video reproducing engine to reproduce DVD-Video data. The AV reproducing engine 2 communicates with the ENAV engine 3 through an application program interface (API). For example, a property indicating the operating state of the AV reproducing engine 2 is transmitted to the ENAV engine 3, and a trigger is transmitted to the ENAV engine 3. Trigger, for example, refers to when a film, e.g., 'Star Wars' is reproduced in the interactive mode, if a battle scene is displayed on an AV screen and a corresponding quiz is displayed on an interactive screen, this case is transmitted to the ENAV engine 3 before and/or after a time where the battle scene is displayed.

The ENAV engine 3 reproduces ENAV files. In particular, the ENAV engine 3 verifies, interprets and executes a markup document as one ENAV file so that DVD-Video data recorded on the ENAV disc 100 is reproduced in the interactive mode. In addition, the ENAV engine 3 combines a reproduced DVD-Video stream with the interpreted markup document and outputs the result to the display device 300. As such, an interactive screen in which an AV screen is embedded is displayed on the display device 300. The ENAV engine 3 may include a variety of plug-in units. By using plug-in units, files having a variety of formats contained in a markup document or linked to the markup document are able to be opened. For example, in order to reproduce AV data for a MICROSOFT WINDOWS Media Player, the ENAV engine 3 is able to call the MICROSOFT WINDOWS Media Player. In addition, the ENAV engine 3 is able to access the network and call information, such as ENAV files.

In particular, according to an aspect of the invention, the ENAV engine 3 reads profile information recorded on a startup file, compares the profile information with player profile information recorded in a system parameter table, and selects a corresponding loading information file according to a comparison result. A list of ENAV files that should be buffered in advance and/or during a reproduction operation for seamless reproduction is recorded in the loading information file. The ENAV engine 3 buffers ENAV files according to the selected loading information file in a buffer (not shown) provided to the ENAV engine 3, interprets and executes an initial file.

Figure 7:
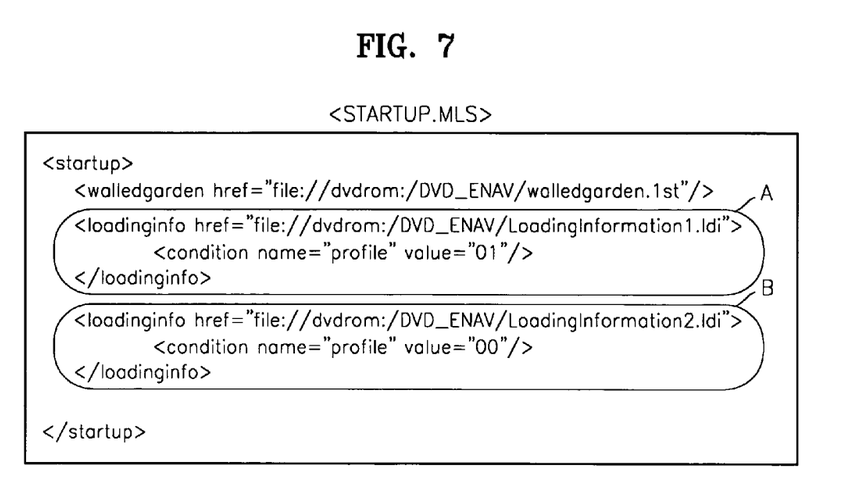
FIG. 7 is an example of a startup file startup.mls according to an embodiment of the invention.

FIG. 7 is an example of a startup file startup.mls according to an aspect of the invention. Referring to FIG. 7, a startup file startup.mls which is a markup document written in markup languages, includes two elements. One element is a 'walledgarden' element, and the other element is a 'loadinginfo' element.

The 'walledgarden' element, for example, links a walled garden list file that enumerates a list of accessible files according to a region of a network that can be accessed through the inserted ENAV disc 100 or a parental level. The 'walledgarden' element is not always recorded in a startup file.

The 'loadinginfo' element links a loading information file, so as to load an ENAV application, which is a set of ENAV files that are needed in reproducing AV data in the interactive mode. In other words, the 'loadinginfo' element indicates position information of ENAV files belonging to the ENAV application. In FIG. 7, by using a 'condition' element included in the 'loadinginfo' element, condition information for selecting one from a plurality of ENAV applications is recorded. More specifically in FIG. 7, the condition information for selecting an ENAV application is recorded using properties 'name' and 'value' recorded in the 'condition' element.

As shown in FIG. 7, two 'loadinginfo' elements exist in the startup file. Reference A indicates a portion in which a first 'loadinginfo' element is recorded, and Reference B indicates a portion in which a second 'loadinginfo' element is recorded. An ENAV application referred to by the first 'loadinginfo' element indicates that values of properties 'name' and 'value', which are each properties of the 'condition' element included in a corresponding 'loadinginfo' element, are recorded as 'profile' and '01', respectively, such that profile information of an ENAV file included in a corresponding ENAV application is '01'. Version information on the ENAV file for constituting an ENAV application referred to by the second 'loadinginfo' element indicates '00'. If the profile information '00' includes markup documents corresponding to DVD-ML 1.0, which are basic specifications for an ENAV application and JPEG and PNG as resource files linked to the markup documents, the profile information '01' may be extended specifications including markup documents or resource files manufactured by adding flash and JAVA languages to the contents of the profile information '00'.

In a conventional reproducing apparatus, restriction conditions of ENAV files are only defined at a divergence point where one of a plurality of ENAV applications should be initially executed, that is, all of the ENAV applications are manufactured according to the same restriction conditions. However, according to an aspect of the invention, since an ENAV file has only one profile information, it is not necessary to select an ENAV application according to profile information. However, profile information is recorded by considering a version of specifications by which an addition and a deletion of a variety of future resource files are defined, and the profile information is included in a startup file so that contents manufactured using a plurality of versions are manufactured when an information storage medium is manufactured.

Figure 8:
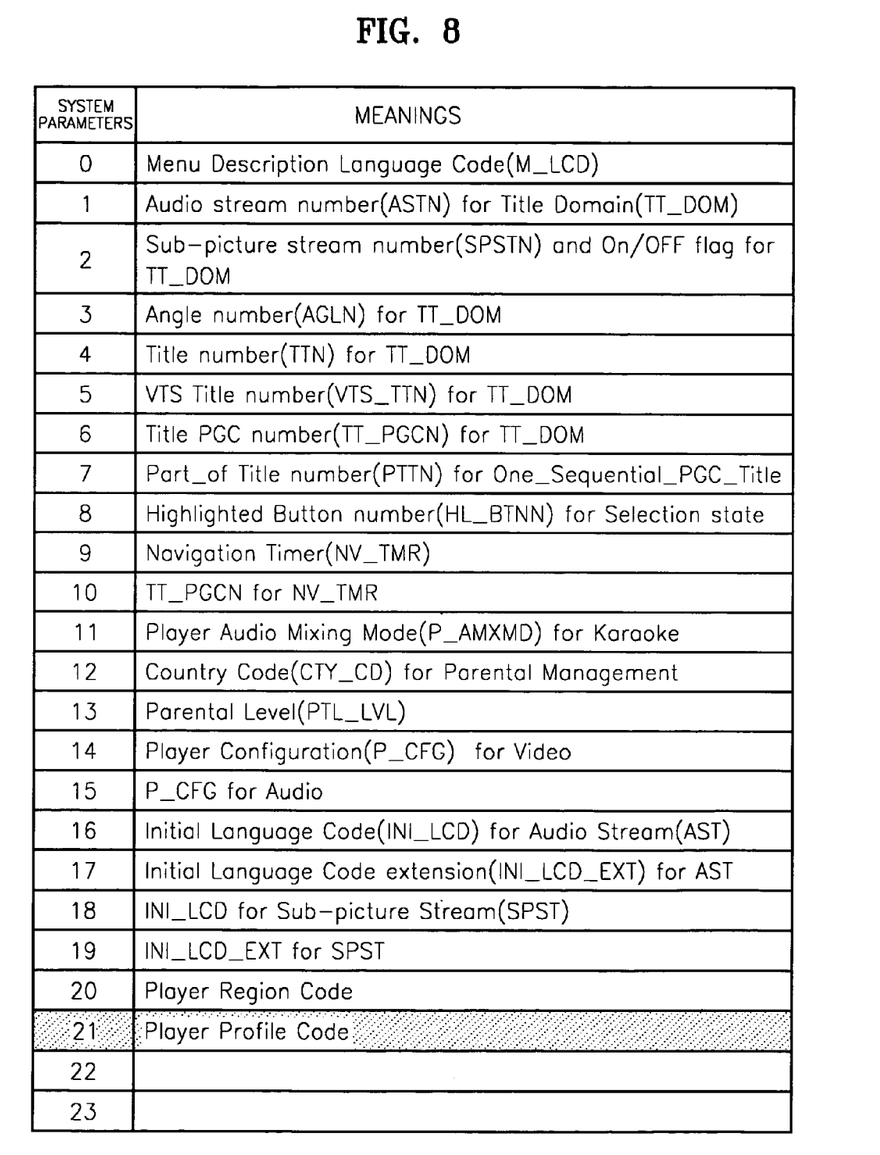
FIG. 8 shows a system parameter table in which profile information is recorded, according to an embodiment of the invention.

FIG. 8 shows a system parameter table in which profile information is recorded, according to an aspect of the invention. Referring to FIG. 8, the system parameter table is stored in the reproducing apparatus 200. Considering compatibility, system parameters 0 through 20 are each implemented as a shape in which player profile information is added to the system parameter table according to system parameters (SPRMs) defined in DVD specifications for read-only disc part 3 video specifications. For example, a value having a fixed length of 2 bytes is stored in each system parameter, and each system parameter has an integer value of 16-bits. In particular, system parameters SPRMs 11 to 21 are referred to as player parameters. Each player parameter has only a read property. Detailed descriptions of the system parameters SPRMs 0 to 20 have no direct relation with the invention; therefore, a detailed description is not provided.

The system parameters SPRMs 21 to 24 stored in the system parameter table are reserved, and the player profile information is recorded as a player profile code in the system parameter SPRM 21. In the present aspect of the invention, for example, the system parameter SPRM 21 is recorded to have only a read property.

Figure 9:
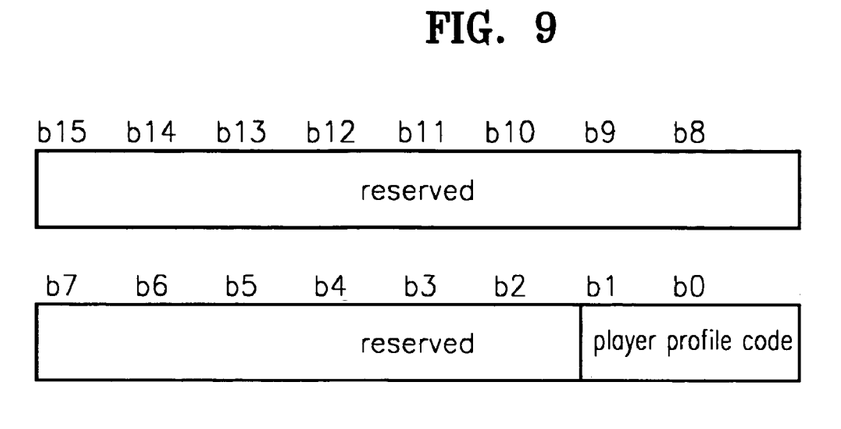
FIG. 9 is a diagram showing a data structure of profile information recorded as a system parameter of FIG. 8.

FIG. 9 is a diagram showing a data structure of profile information recorded as a system parameter of FIG. 8. Referring to FIG. 9, the player profile information is recorded as 2 bits of 2 bytes allocated to the SPRM 21. Thus, the remaining 14 bits are reserved, and other information may be recorded therein.

The SPRM 21 includes 00b as a basic value. 00b refers to player profile information according to basic specifications of DVD-Video in which interactive data is further recorded. For examples, an expanded version of the player profile information may be defined as 01b, 10b, and 11b.

If basic player profile information (e.g., '00b') is upgraded and recorded together with an ENAV DVD in which interactive data of a previous version is together recorded, for lower compatibility with interactive data of a new version (e.g., '01 b'), a reproducing apparatus for supporting a new version '01 b' selects and reproduces loading information file 'loadinginfomation1.1di' indicating position information of an ENAV application recorded in the startup file of FIG. 7 according to a new version, by referring to profile information '01b' recorded in the SPRM 21. However, a reproducing apparatus for supporting a previous version '00b' selects and reproduces loading information file 'loadinginfomation2.1di' indicating position information of an ENAV application corresponding to a previous version '00b' in the startup file of FIG. 7 so that the previous version '00b' is added to the version information '00b' recorded in the SPRM 21 of the reproducing apparatus.

Figure 10:
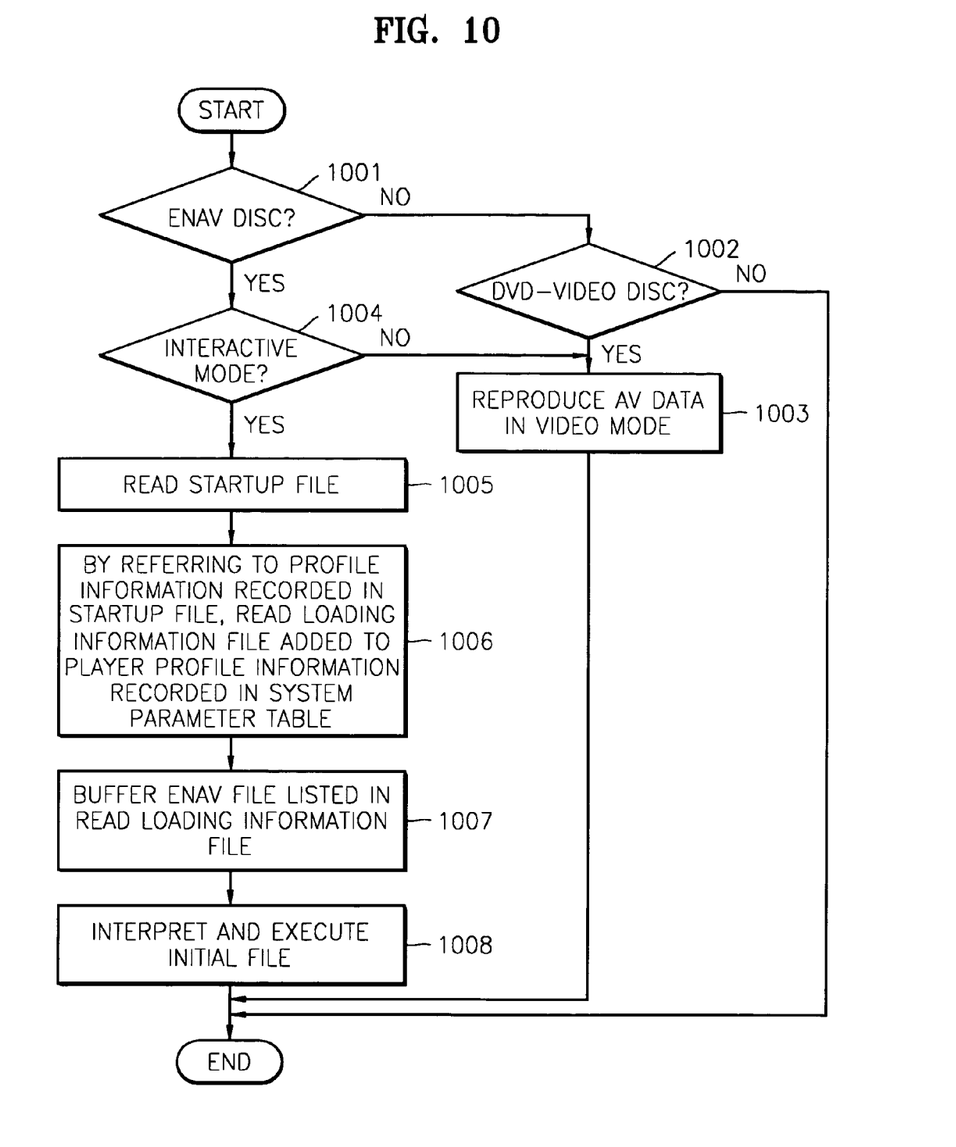
FIG. 10 is a flowchart showing a method for reproducing AV data in interactive mode according to an embodiment of the invention.

A method of reproducing AV data in an interactive mode using the reproducing apparatus having the above-described structure is described below with reference to FIG. 10. FIG. 10 is a flowchart showing a method for reproducing AV data in the interactive mode according to an aspect of the invention. Referring to FIG. 10, if the ENAV disc 100 is loaded into the reproducing apparatus 200, the reproducing apparatus 200 checks a startup file stored in the DVD_ENAV directory and determines whether the inserted disc is the ENAV disc 100 (operation 1001). If the startup file is not found, the reproducing apparatus 200 determines the inserted disc as a conventional DVD-Video disc (operation 1002) and reproduces AV data in a video mode (operation 1003) or simply does not reproduce the disc.

If the startup file is found, the reproducing apparatus 200 recognizes the inserted disc is the ENAV disc 100 (operation 1001), and if a user selects video mode, the reproducing apparatus 200 reproduces AV data in the video mode (operation 1003). If the user selects an interactive mode (operation 1004), the reproducing apparatus 200 reads the startup file (operation 1005), reads profile information recorded in the startup file, and reads a loading information file added to the player profile information recorded in the system parameter table (operation 1006). The reproducing apparatus then buffers an ENAV file listed in the read loading information file (operation 1007), interprets and executes an initial file and reproduces the selected AV data in the interactive mode (operation 1008).

The above-described reproducing method can be embodied as a computer program to be read by a computer. Codes and code segments for constituting the computer program can be easily deciphered by a computer programmer. In addition, the computer program is stored in computer readable media, read and executed by the computer, thereby implementing the reproducing method. The computer readable media includes media such as, magnetic recording media, optical data storage units, etc. Aspects of the present invention may also be realized as a data signal embodied in a carrier wave and comprising a program readable by a computer.

As described above, according to an aspect of the invention, an information storage medium, in which interactive data having a data structure that can be adaptively reproduced in a variety of reproducing apparatuses having different ranges of interactive data that is needed in reproducing AV data in the interactive mode, and a method and apparatus for reproducing AV data in the interactive mode are included. Further, the information storage medium in which interactive data with a data structure having a high compatibility is recorded can be manufactured, and a user can have a wider range of selection.

While this invention has been particularly shown and described with reference to preferred embodiments thereof, it will be understood by those skilled in the art that various changes in form and details may be made therein without departing from the spirit and scope of the invention as defined by the appended claims.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of reproducing audio/video data from an information storage medium in an interactive mode, by a reproducing apparatus, the method comprising:
reading profile information from the information storage medium, the profile information indicating a version number of a markup language or a program language that is used to make ENAV files constituting interactive data to be used in the interactive mode;
comparing the profile information with player profile information of the reproducing apparatus indicating a range of version numbers of interactive data supported by the reproducing apparatus;
determining whether the interactive data supported by the reproducing apparatus exists in the information storage medium by determining whether interactive data that is manufactured with a version number that has a value of N or less exists in the information storage medium when a value of a version number of the player profile information of the reproducing apparatus is N, where N is an integer;
selecting and reading one interactive data among interactive data that are manufactured with the version number that have the value of N or less; and
interpreting and executing the read interactive data.

2. The method of claim 1, wherein the reading of the profile information from the information storage medium comprises:
opening a startup file that is initially read when the interactive mode is selected; and
reading the profile information.

3. The method of claim 2, wherein the reading of the profile information from the information storage medium comprises:
reading the profile information from the startup file recorded using an element for linking a loading information file included in a corresponding enhanced navigation application.

4. The method of claim 3, wherein the selecting and reading of the one interactive data comprises:
reading a version number of an enhanced navigation application from the player profile information that is stored as a system parameter, wherein the enhanced navigation application is supported by the reproducing apparatus.

5. The method of claim 3, wherein the selecting and reading of the one interactive data comprises:
reading enhanced navigation files relating to the corresponding enhanced navigation application by referring to the loading information file, which indicates position information of enhanced navigation files relating to corresponding enhanced navigation applications.

6. The method of claim 1, wherein the reading of the profile information from the information storage medium comprises:
reading profile information indicating version numbers of a plurality of enhanced navigation applications manufactured with a plurality of version numbers in order to reproduce audio/video data in the interactive mode.

7. An information storage medium to store information, which is reproduced by a reproducing apparatus, the stored information comprising:
interactive data for reproducing audio/video data in an interactive mode, wherein the interactive data is displayed on the reproducing apparatus together with an audio/video screen that is obtained from the audio/video data and provides additional information related to the audio/video screen; and
profile information indicating a version number of a markup language or a program language that is used to make ENAV files constituting the interactive data to be used in the interactive mode,
wherein the reproducing apparatus compares the profile information with player profile information of the reproducing apparatus indicating a range of version numbers of interactive data supported by the reproducing apparatus and determines whether the interactive data supported by the reproducing apparatus exists in the information storage medium by determining whether interactive data supported by the reproducing apparatus exists in the information storage medium by determining whether interactive data that is manufactured with a version number that has a value of N or less exists in the computer-readable medium when a value of a version number of the player profile information of the reproducing apparatus is N, where N is an integer, and wherein one interactive data among interactive data that are manufactured with the version number that have the value of N or less is selected and read by the reproducing apparatus.

8. The information storage medium of claim 7, wherein the interactive data includes a startup file that is initially read when the interactive mode is selected, and the profile information is recorded in the startup file.

9. The information storage medium of claim 7, wherein the profile information enables the interactive data to be reproduced by the reproducing apparatus for reproducing the audio/video data in the interactive mode.

10. An apparatus for reproducing audio/video data in an interactive mode from an information storage medium having recorded thereon the audio/video data, an enhanced navigation application corresponding to the interactive mode, and profile information indicating a version number of a markup language or a program language that is used to make enhanced navigation application files constituting interactive data to be used in the interactive mode, the apparatus comprising:

an audio/video reproducing engine that decodes the audio/video data; and an enhanced navigation engine that has player profile information indicating a range of version numbers of enhanced navigation applications supported by the reproducing apparatus, compares the profile information with the player profile information of the reproducing apparatus and determines whether an enhanced navigation application supported by the reproducing apparatus exists in the information storage medium by determining whether an enhanced navigation application that is manufactured with a version number that has a value of N or less exists in the information storage medium when a value of a version number of the player profile information of the reproducing apparatus is N, where N is an integer, and interprets and executes one enhanced navigation application that is selected to be supported by the reproducing apparatus, wherein the version number of the supportable enhanced navigation application is a version number of document type definition (DTD) of markup languages used to make ENAV files, a version number of program languages used to make ENAV files, a version number of languages used to implement one ENAV application, or a version number of specifications in which restriction conditions of a variety of resource files linked to markup documents, and wherein the apparatus initially reads a startup file when the interactive mode is selected; and wherein the enhanced navigation engine reads the profile information that is recorded in the startup file and selects the enhanced navigation application by referring to the player profile information and the profile information.

11. The apparatus for reproducing audio/video data in the interactive mode of claim 10, wherein the player profile information is stored as a system parameter.

12. The apparatus for reproducing audio/video data in the interactive mode of claim 10, further comprising a reader that reads the enhanced navigation application from the information storage medium.

13. The apparatus for reproducing audio/video data in the interactive mode of claim 10, wherein a plurality of enhanced navigation applications are manufactured with a plurality of version numbers and the profile information of each enhanced navigation application is stored in the information storage medium, and the enhanced navigation engine selects one from the plurality of enhanced navigation applications by referring to the profile information.

14. The apparatus for reproducing audio/video data in the interactive mode of claim 10, wherein the enhanced navigation engine refers to the profile information recorded using an element for linking a loading information file included in a corresponding enhanced navigation application.

15. An apparatus for reproducing audio/video data in an interactive mode, the apparatus comprising:

a reader to read the audio/video data;

an audio/video reproducing unit to reproduce the audio/video data read by the reader; and an enhanced navigation unit connected with the audio/video reproducing unit to reproduce enhanced navigation files, wherein the reader reads audio visual data in response to a control signal from the enhanced navigation unit, wherein the enhanced navigation unit reads profile information recorded on an enhanced navigation storage medium, compares the read profile information with player profile information, the player profile information indicating a range of version numbers of the interactive data supported by a reproducing apparatus, determines whether interactive data supported by the apparatus exists in the enhanced navigation storage medium by determining whether interactive data that is manufactured with a version number that has a value of N or less exists in the enhanced navigation storage medium when a value of a version number of the player profile information of the apparatus is N, where N is an integer, selects one interactive data among interactive data that are manufactured with a version number that have the value of N or less, and reproduces audio/video data stored on the enhanced navigation storage medium in the interactive mode using the selected one interactive data wherein the profile information indicates a version number of a markup language or a program language that is used to make ENAV files constituting interactive data to be used in the interactive mode and the version number is a version number of document type definition (DTD) of markup languages used to make ENAV files, a version number of program languages used to make ENAV files, a version number of languages used to implement one ENAV application, or a version number of specifications in which restriction conditions of a variety of resource files linked to markup documents, and wherein the apparatus initially reads a startup file when the interactive mode is selected; and wherein the enhanced navigation unit reads profile information that is recorded in the startup file and selects the interactive data from the enhanced navigation storage medium by referring to the player profile information and the profile information when the player profile information is the same as the profile information corresponding to particular interactive data.

* * * * *

UNITED STATES PATENT AND TRADEMARK OFFICE
CERTIFICATE OF CORRECTION

PATENT NO. : 7,653,288 B2  Page 1 of 1
APPLICATION NO. : 10/902252
DATED : January 26, 2010
INVENTOR(S) : Jung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1358 days.

Signed and Sealed this

Twenty-eighth Day of December, 2010

David J. Kappos
*Director of the United States Patent and Trademark Office*